United States Patent
Knauf et al.

(10) Patent No.: US 6,521,720 B2
(45) Date of Patent: Feb. 18, 2003

(54) CONTINUOUS PROCESS FOR PRODUCING ELASTOMERS

(75) Inventors: Thomas Knauf, Dormagen (DE); Josef-Werner Naunheim, Dormagen (DE); Klaus Wiemann, Lillebonne (FR)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/061,930

(22) Filed: Feb. 1, 2002

(65) Prior Publication Data

US 2002/0107339 A1 Aug. 8, 2002

(30) Foreign Application Priority Data

Feb. 7, 2001 (DE) .......................................... 101 05 401

(51) Int. Cl.$^7$ .................................................. C08F 2/04
(52) U.S. Cl. ........................ 526/65; 526/335; 526/346; 526/329.2
(58) Field of Search ......................... 526/65, 335, 346, 526/329.2

(56) References Cited

U.S. PATENT DOCUMENTS

| | | | |
|---|---|---|---|
| 4,022,959 A | 5/1977 | Sommer et al. | 526/180 |
| 4,091,198 A | 5/1978 | Smith et al. | 526/178 |
| 4,145,497 A | 3/1979 | Sylvester et al. | 526/164 |
| 4,843,120 A | * 6/1989 | Halasa et al. | 525/53 |
| 5,008,343 A | 4/1991 | Hellermann et al. | 525/316 |
| 5,239,009 A | 8/1993 | Halasa et al. | 525/258 |
| 5,397,851 A | 3/1995 | Knauf et al. | 526/92 |
| 5,906,956 A | 5/1999 | Halasa et al. | 502/154 |
| 6,300,450 B1 | 10/2001 | Tsujimoto et al. | 526/335 |

FOREIGN PATENT DOCUMENTS

| | | |
|---|---|---|
| CA | 1143711 | 3/1983 |
| CA | 2324174 | 4/2001 |
| EP | 652 234 | 5/1995 |
| EP | 652 240 | 5/1995 |
| GB | 979 286 | 8/1963 |

OTHER PUBLICATIONS

Journal of Organometallic Chemistry, 451 (month unavailable) 1993, pp. 67–72, Giovanni Ricci and Salvatore Italia, Polymerization of 1,3–dienes with the soluble catalyst system methyl–aluminoxanes–[CpTiCl$_3$]. Influence of monomer structure on polymerization stereospecificity.

Werner Hofmann, Rubber Technology Handbook, Carl Hanser Publisher, Munich Vienna, New York, (month available) 1989, pp. 52–67, Synthetic Rubber.

Makromol. Chem. Rapid Commun. 11, (month unavailable) 1990, pp. 519–524, Leone Oliva, Pasquale Lango, Alfonso Grossi, Paolo Ammendola, Claudio Pellecchia, Polymerization of 1,3–alkadienes in the presence of Ni– and Ti–based catalytic systems containing methylalumoxane.

* cited by examiner

Primary Examiner—David W. Wu
Assistant Examiner—William K Cheung
(74) Attorney, Agent, or Firm—Joseph C. Gil; Noland J. Cheung; Jennifer R. Seng

(57) ABSTRACT

The present invention relates to a continuous process for producing elastomers based on conjugated dienes or based on conjugated dienes and vinyl aromatic compounds or based on alkenes, polymerization being carried out while maintaining certain residence times of the monomers used and the elastomers obtained in the reactors while maintaining a certain temperature gradient in the first reactor. The elastomers obtained by the process according to the invention are characterized in particular by a low metal ion content, a low ash content and a high cis-1,4 compound content in the polymer. Furthermore, the process according to the present invention is particularly economical.

5 Claims, No Drawings

CONTINUOUS PROCESS FOR PRODUCING ELASTOMERS

FIELD OF THE INVENTION

The present invention relates to a continuous process for producing elastomers based on conjugated dienes or based on conjugated dienes and vinyl aromatic compounds or based on alkenes, polymerization being carried out while maintaining certain residence times of the monomers used and the elastomers obtained in the reactors.

BACKGROUND OF THE INVENTION

It is known to carry out the polymerization of conjugated dienes or of conjugated dienes and vinyl aromatic compounds or of alkenes in the presence of, for example, Ziegler-Natta catalysts or in the presence of anionic initiators.

It is also known and customary in practice to carry out polymerization in one or more reactors, the catalysts and the monomers used, optionally distributed over the various reactors used, being metered into the polymerization mixture. If a plurality of reactors is used, it is customary in the known process for the residence time of the monomers used and the elastomers obtained to be longer in the remaining reactors than in the first reactor.

However, it has proven to be disadvantageous in the processes for producing elastomers based on the above-mentioned monomers carried out to date that there is gelling of the reactors during prolonged operation thereof, so the reactors have to be cleaned frequently and therefore have a short service life. Furthermore, the catalyst consumption in polymerization reactions carried out in this way is relatively high and this adversely affects. the economic viability of the process. The product quality obtained by the previous processes is also capable of improvement, in particular as regards the gel content, and, when using chlorine-containing catalysts, the chlorine content, the metal ion content, the ash content and, optionally, the cis-1,4 compound content in the polymer.

SUMMARY OF THE INVENTION

The object of the present invention is therefore, inter alia, to improve the economic viability of the previous processes for producing diene polymers as well as the product quality of the polymers obtained.

It has now been found that, with the process according to the invention, the disadvantages described can be avoided and this can be combined with an increase in the economic viability or productivity and the product quality.

The subject of the present invention is, therefore, a continuous process for producing elastomers based on conjugated dienes or based on conjugated dienes and vinyl aromatic compounds or based on alkenes, characterized in that polymerization is carried out in the presence of an inert solvent and in the presence of polymerization catalysts in at least two reactors connected in series, the residence time of the monomers used and the elastomers formed in the first reactor being adjusted such that the residence time of the monomers used and the elastomers formed in the first reactor to the residence time of the monomers used and the elastomers formed in the remaining reactors is in the range of 1:1 to 4:1, the temperature gradient in the first reactor being $\leq 25°$ C. and the temperature in the individual reactors during polymerization being in the range of 0 to 140° C.

DETAILED DESCRIPTION OF THE INVENTION

The residence time of the monomers used and the elastomers formed in the first reactor is preferably adjusted such that the residence time of the monomers used and the elastomers formed in the first reactor to the residence time of the monomers used and the elastomers formed in the remaining reactors is in the range of 1:1 to 3:1, preferably, in the range of 1.1:1 to 2.5:1, and more preferably in the range of 1.2:1 to 2:1. In the event of two or more reactors being connected in series, it is important for the entire residence time ratio, that the residence time of the monomers and elastomers in the remaining reactors—meaning the reactors which are connected downstream of the first reactor—is divided such that the claimed ratio always results. Therefore, distribution of the respective residence times in the remaining reactors can be arbitrarily selected, it being possible for the most favorable distribution to be easily ascertained by appropriate preliminary tests. The type of reactors used, the type of catalysts and monomers used inter alia play a role in the distribution of the residence times.

Of course, it is possible in the process according to the invention to distribute the residence time of the monomers used and the elastomers formed among a plurality of reactors connected in parallel instead of to a first reactor, which reactors are then to be considered as a first reactor. For example, instead of a first reactor, two or three reactors can be connected in parallel and therefore function as a first reactor. It is important for the process according to the invention that, in addition to the first reactor or the first reactors, additional reactors are also used which are then connected in series. The number of reactors connected in series is dependent inter alia on economic considerations relating to the process and can amount to 2 to 10, preferably 2 to 7, more preferably 2 to 3, additional reactors.

In addition to the residence time ratio of the monomers used and the elastomers formed in the individual reactors, it is important for the process according to the present invention that the temperature gradient in the first reactor or the first reactors connected in parallel is $\leq 25°$ C., preferably $\leq 15°$ C., and more preferably $\leq 10°$ C. In this case, the temperature gradient is taken to mean the temperature difference in the first reactor resulting from the measurement of the temperature at the inlet of the monomers used and at the outlet of the product stream issuing from the first reactor or the first reactors, which essentially contains solvent, elastomers formed and monomers used.

The temperature during polymerization in the individual reactors is preferably in the range of 10 to 130° C., more preferably 20 to 120° C.

In the process according to the present invention, the polymerization reactors known for this purpose can be used as reactors. Preferably, stirred-tank reactors are used.

The process according to the present invention is carried out in the inert organic solvents known for this process, examples being butanes, butenes, pentanes, hexanes, heptanes, methylcylcopentane or cyclohexane. Both the straight-chain and the branched isomers of aliphatic solvents are examples thereof. Furthermore, aromatic solvents such as benzene, toluene or ethylbenzene can also be used. The solvents can be used both individually or mixed with one another.

The quantity of solvent used is not critical. The most favorable quantity can be ascertained by appropriate preliminary tests and depends inter alia on economic considerations.

All known dienes which are conventional in the production of corresponding elastomers can be used in the process according to the present invention as conjugated dienes. Examples are: 1,3-butadiene, isoprene, piperylene, 1,3-hexadiene, 1,3-octadiene and 2-phenyl-1,3-butadiene, preferably 1,3-butadiene and isoprene.

The known vinyl aromatic compounds which can be copolymerized together with the conjugated dienes are also examples of vinyl aromatic compounds. Examples include styrene, p-methylstyrene, α-methylstyrene, 3,5-dimethylstirene, vinyinaphthalene, p-tert.-butylstyrene, divinylstyrene and diphenylethylene, preferably styrene.

The quantity of vinyl aromatic compounds used is conventionally 5 to 55 wt. %, preferably 10 to 45 wt. %, and the quantity of conjugated dienes used corresponds to 45 to 95 wt. %, preferably 55 to 90 wt. % in the copolymerization of the above-mentioned conjugated dienes with the above-mentioned vinyl aromatic compounds.

Furthermore, alkenes such as ethylene and propylene, can be used in the process according to the present invention to form the elastomers. These may optionally be reacted in a known manner with non-conjugated polyenes, such as ethylenenorbornene, vinylidenenorbornene, dicyclopentadiene, 2-methyl-1,5-hexadiene, 3,3-dimethyl-1,5-hexadiene, 1,6-heptadiene, 1,7-octadiene, 1,6-nonadiene, 1,9-decadiene and 1,19-eicosadiene to form corresponding copolymers, for example terpolymers such as EPDM, with elastomer properties. The above-mentioned non-conjugated polyenes can be copolymerized individually or in a mixture with one another with the above-mentioned alkenes. The non-conjugated polyene content is conventionally up to 15 wt. %, preferably 10 wt. %, the alkene content accordingly being augmented up to 100 wt. %. During the production of corresponding terpolymers, the quantity of ethylene and propylene monomers is generally approximately 20 to 80 wt. % (ethylene) and 18 to 20 wt. % (propylene).

As mentioned previously, the process according to the present invention can be carried out in the presence of catalysts or initiators known for polymerization of the above-mentioned monomers. In other words: the process according to the present invention is not limited to a specific catalyst or specific catalysts or a specific catalyst or initiator system. Therefore, all known Ziegler-Natta catalysts and catalyst systems and the known anionic initiators can be considered. Ziegler-Natta catalysis with corresponding catalysts and anionic polymerization with corresponding initiators, for example, are described in more detail in W. Hoffmann, Rubber Technology Handbook, Carl Hanser Publishers, Munich, Vienna, New York, page 52 to 67, 1989 or in Polymer Synthesis, Hüttig and Wepf Publishers, Basle, Heidelberg, New York, 1986, page 124 to 132 and page 176 to 181.

Examples of Ziegler-Natta catalysts are systems based on titanium, cobalt, vanadium and nickel compounds and systems based on compounds of rare earth metals.

The various types of Ziegler-Natta catalysts can be used both individually and in a mixture with one another.

Ziegler-Natta catalysts based on compounds of rare earth metals are preferably used, such as cerium, lanthanum, praseodymium, gadolinium or neodymium compounds which are soluble in hydrocarbons. The corresponding salts of the rare earth metals are preferably used as the Ziegler-Natta catalysts, such as neodymium carboxylates, in particular neodymium neodecanoate, neodymium octanoate, neodymium naphthalate, neodymium-2,2-diethyl hexanoate, neodymium-2,2-diethyl heptanoate, and the corresponding salts of lanthanum or praseodymium.

The Ziegler-Natta catalysts which can be used also include catalyst systems based on metallocenes, as described, for example, in the following literature: L. Oliva, P. Longo, A. Grossi, P. Ammendola, C. Pellecchia; Makromol. Chem. rapid Comm. 11, 1990, 519, G. Ricci, S. Halia, A. Giarrusso, L. Porri, J. Organomet. Chem. 67, 1993, 451, German patent application No. 199 39 842.9, EP-A 919 574.

Systems of this type are conventionally produced from
a) at least one compound of the rare earth metals,
b) at least one cyclopentadieneyl compound and
c) at least one organoaluminum compound
or produced from
a) at least one compound of the rare earth metals and
b) at least one organoaluminum compound.

The structural components a) to c) of the above-mentioned Ziegler-Natta catalysts are known to the person skilled in the art and can be found in the relevant literature.

A common Ziegler-Natta catalyst system is based, for example, on cobalt octoate as component A, on diethyl aluminum chloride as component B and on water as component C in systems made up of three components (for more information see U.S. Pat. No. 5,397,851).

The above-mentioned Ziegler-Natta catalysts and the catalyst systems based on Ziegler-Natta catalysts with appropriate cocatalysts are, for example, described, as mentioned, in W. Hoffmann, Rubber Technology Handbook, Carl Hanser Publishers, Munich, Vienna, New York, page 52 ff., 1989. More specific Ziegler-Natta catalyst systems are also described in the German patent application with the application No. 19951841.6 and in DE-A 28 48 964 and DE-A 26 25 390.

In a preferred embodiment, the polymerization of the unsaturated monomers is carried out in the presence of a Ziegler-Natta catalyst, as described in German patent application No. 19951841.6.

According to the above-mentioned German patent application, a catalyst system based on compounds of the rare earth metals is used, containing
a) a compound of the rare earth metals,
b) an organic aluminum compound,
c) a trihalogen silane of formula

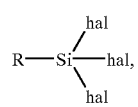

wherein
hal is fluorine, chlorine and bromine and
R is hydrogen or a vinyl group,
wherein the components a):b):c) are present in a ratio of 1:0.5 to 5:0.05 to 0.5.

Catalyst systems according to the present invention based on compounds of the rare earth metals, in which the components a):b):c) are present in a weight ratio of 1:1 to 2:0.1 to 0.4 are preferred and the component a) is neodymium versatate, component b) is diisobutyl aluminum hydride and component c) is trichlorosilane.

The Ziegler-Natta catalysts based on compounds of the rare earths are generally used in the process in quantities of approximately 0.01 to 1 mmol, preferably 0.03 to 0.2 mmol, based on 100 g polymer. The quantity of catalysts to be used is directed, in particular, toward the type of catalysts to be used and the rubber properties desired.

In the process according to the present invention, lithium metal-containing initiators are primarily used as anionic initiators. Examples thereof are n-butyl lithium, sec.-butyl lithium, tert.-butyl lithium, n-propyl lithium, isopropyl lithium, ethyl lithium, cyclohexyl lithium, phenyl lithium and 2-naphthyl lithium, in particular, n-butyl lithium.

The anionic initiators are conventionally used in quantities of 0.1 to 15 mmol, preferably 0.2 to 10 mmol, based on 100 g polymer in the process according to the present invention.

It can be advantageous in the process according to the present invention if alkali metal compounds are used, in addition to the lithium metal-containing initiators.

The alkali metal compounds can be selected from alkali metal compounds of the following general formulae:

wherein
$R^1$, $R^2$, $R^3$, $R^4$ and $R^5$ are an alkyl group, a cycloalkyl group, an alkenyl group, an aryl group or a partially substituted group thereof with up to 16 C atoms, and
M is Na, K, Rb or Cs.

Examples of alkali metal compound of the formula $R^1M$ are compounds such as methyl sodium, ethyl potassium, n-propylrubidium, ethylcaesium, t-butyl sodium, t-amyl potassium, n-hexylrubidium, 4-methylcyclohexyl sodium, 3-hexenyl potassium, 2,5-decadienylrubidium, 4,6-di-n-butyldecyl sodium, phenyl potassium, benzyl sodium or 4-tolyl potassium.

Alkali metal salts of mono- or polyhydric alcohols or phenols such as sodium, potassium, rubidium or caesium salts of methyl alcohol, ethyl alcohol, n-propyl alcohol, isopropyl alcohol, t-butyl alcohol, t-amyl alcohol, n-hexyl alcohol, cyclohexyl alcohol, 2-butenyl alcohol, 4-methylcyclohexenyl alcohol, 3-cyclopentenyl alcohol, 3-hexenyl alcohol, 2,5-decadienyl alcohol, allyl alcohol, 1,3-dihydrohexane, 1,5,9-trihydroxytridecane, benzyl alcohol, phenol, catechol, resorcinol, hydroquinone, pyrogallol, 1-naphthol, 2-naphthol, 2,6-di-t-butyl-4-methyl phenol, 2,4,5,6-tri-t-butyl phenol, n-nonyl phenol or 1,12-dodecanediol can be used as alkali metal compound of formula $R^2OM$.

The alkali metal salts of mono- or polybasic carboxylic acids such as sodium, potassium, rubidium or caesium salts of lauric acid, myristic acid, palmitic acid, stearic acid, arachidic acid, linoleic acid, linolenic acid, phenyl acetic acid, benzoic acid, sebacic acid, phthalic acid or 1,8,16-hexadecanetoloyl carboxylic acid can be used as alkali metal compound of formula $R^3COOM$.

Alkali metal salts of secondary amines, such as sodium, potassium, rubidium or caesium salts of dimethylamine, di-n-butylamine, methyl-n-hexylamine, di(3-hexenyl) amine, diphenylamine or dibenzylamine can be used as alkali metal compound of formula $R^4R^5NM$.

The alkali metal-containing alkoxides used in the process according to the present invention are preferably the sodium, potassium, rubidium or caesium salts of methyl alcohol, ethyl alcohol, n-propyl alcohol, isopropyl alcohol, tert.-butyl alcohol, tert.-amyl alcohol, n-hexyl alcohol, cyclohexyl alcohol, butyl alcohol, phenol or 1-naphthol. The sodium salt of the tert.-amyl alcohol is most preferred.

The alkali metal compounds are conventionally used in the process according to the present invention in a quantity such that the molar ratio of lithium metal-containing initiator or other anionic initiators to alkali metal compounds is approximately 1:0.005 to 1:0.25.

Of course, it is also possible to carry out the process according to the present invention in the presence of the so-called modifiers, such as ethers and/or amine compounds, for example tertiary amines, which are capable of controlling the vinyl content in the polymer chain. Examples of ether compounds and amine compounds are in particular: triethylamine, pyridine, tetramethylethylenediamine (TMEDA), bis-(dimethylaminoethyl)ethane, tetrahydrofuran (THF), diethylether, diphenylether, anisole, ethyleneglycol dimethylether, ethyleneglycol diethylether, ethyleneglycol ethyl-tert.-butylether, 2,2-bis-(2-oxolanyl)propane or oligomeric oxolanylalkanes. The above-mentioned modifiers can be used both individually and in a mixture with one another.

Modifiers of this type are known and described in more detail, for example, in EP-A 0 304 589, DE-A 4 234 827, U.S. Pat. Nos. 4,022,959 and 5,906,956.

The optimal quantity of modifiers to be used can be easily determined by appropriate preliminary tests and is directed toward the desired content of vinyl groupings in the polymer chain. Conventional are quantities of approximately 0.005 to 400 mmol per 100 g of monomers used.

A preferred embodiment of the process according to the invention can, for example, be configured in such a way that the monomers, for example, the conjugated dienes or the conjugated dienes and the vinyl aromatic compounds, are metered together with a Ziegler-Natta catalyst or an anionic initiator and the solvent in approximately equal parts into two first reactors connected in parallel and the polymerization is brought to an end in two further reactors connected in series. The residence time ratio here between the first reactors connected in parallel and the subsequent reactors connected in series is adjusted such that it is in the range of approximately 1.5:1 and a temperature gradient is adjusted in the first reactor of ≦10° C. Polymerization in the reactors is carried out at temperatures in the range of approximately 20 to 120° C., as a function inter alia of the catalysts, solvents, reactor types and monomers used.

After the polymerization reaction has ended, the polymer obtained is worked up and isolated in a conventional and known manner.

The polybutadienes produced by the process according to the invention using Ziegler-Natta catalysts or catalyst systems have, depending on the type of catalysts used, a halogen content of less than 400 ppm, preferably 300 ppm, and more preferably 200 ppm, a transition metal ion content of less than 250 ppm, preferably 150 ppm, and more preferably 100 ppm, an ash content of less than 0.15, preferably 0.12, and more preferably 0.1 wt. %, and have a cis-1,4 bond in the polymer of >96%, preferably >97%, and more preferably >98%. When using Ziegler-Natta catalysts or catalyst systems based on titanium, polybutadienes are obtained which have a cis-1,4 content in the polymer of approximately 92 to 93%.

The elastomers produced according to the present invention can be vulcanized in a known manner. They can be used to produce rubber articles of all kinds, preferably to produce tires or tire components or golf balls. It is also possible, in particular with polybutadiene, to use this to produce high impact polystyrene (HIPS).

Reference is made in particular to the fact that, due to the process according to the present invention, it is also possible to produce elastomers which have an extremely low undesired secondary and bi-product content and therefore exhibit outstanding product quality. Additional complex cleaning processes for the elastomers obtained can therefore be dispensed with. Furthermore, the process according to the present invention is extremely economical.

EXAMPLES

Production of neodymium polybutadiene (NdBR) with a high cis-1,4 bonding content.

General Rules of Procedure

The processes described in the following individual examples were carried out in a continuous manner in a plurality of stirred-tank reactors connected one behind the other under adiabatic conditions. The total volume of the reactors was 80 m$^3$. The overall conversion of butadiene during polymerization was quantitative. Polymerization was carried out under inert conditions with hexane as solvent. Both the solvent used and the monomer used (1,3-butadiene) were dried in advance and metered in this form into the reactors. The butadiene concentration in the solvent was 18.5%. The reactors, i.e. the plant, were operated with a load of 7 t butadiene/h respectively. After polymerization had ended, the polybutadiene obtained was separated from the solvent in the conventional manner, worked up accordingly and dried.

In all examples, neodymium versatate (NdV) in combination with ethyl aluminum sesqui-chloride (EASC) and diisobutyl aluminum hydride (DIBAH) were used as catalyst system. (Molar ratio NdV:EASC:DIBAH=1:0.95:6.0). The quantity of catalyst system consumed or used can be found in the following examples.

Polymerization was carried out at temperatures of 60 to 90° C. (first reactor) and 70 to 120° C. (remaining reactors).

Comparison Example

The comparison example was carried out in such a way that the residence time of the butadiene used in the first reactor to the residence time of the butadiene used and of the polybutadiene formed in the remaining reactors was 1:3.

The temperature gradient in the first reactor was: 11° C. The catalyst consumption of neodymium versatate was 0.13 phr, of EASC 0.048 phr and of DIBAH 0.15 phr.

After complete conversion of the 1,3-butadiene used, a polybutadiene was obtained which had a cis-1,4 content of 96%, a metal ion content (neodymium) of 280 ppm, an ash content of 0.16 wt. % and a chlorine content of 440 ppm. After a service life of just 1 month, due to gelling, the reactors had to be turned off and cleaned.

Example 1
(According to the Present Invention)

Polymerization of the butadiene was carried out in a manner similar to that of the comparison example except that the residence time ratio was 1:1 and a temperature gradient of 10° C. was adjusted in the first reactor.

The consumption of neodymium versatate was 0.05 phr, of EASC 0.0185 phr and of DIBAH 0.15 phr during the polymerization. A polybutadiene with a cis-1,4 content of 97.5% with a metal ion (Nd) content of 140 ppm and an ash content of 0.11 wt. % was obtained. The chlorine content was 220 ppm. The service life of the reactors was 6 months, i.e. after 6 months the reactors were switched off and cleaned.

Example 2
(According to the Present Invention)

Polymerization of the butadiene was carried out in a manner similar to the preceding examples. The residence time ratio was 1.5:1. The temperature gradient was 13° C.

The consumption of neodymium versatate was 0.035 phr, of EASC 0.0092 phr and of DIBHA 0.14 phr. The service life of the reactors was 12 months.

After polymerization, a polybutadiene with a cis-1,4 bonding content of 98.5% was obtained. The metal ion (Nd) content was 79 ppm, the ash content 0.09 wt. % and the chlorine content 82 ppm.

In the present comparison example, four reactors were connected in series. In example 1 according to the present invention, two reactors were connected in parallel (first reactor) and two reactors were connected in series, so the total number of reactors was four. In example 2 according to the invention, three reactors were connected in parallel, followed by one reactor in series. Again four reactors were used in total.

From the comparison of the polymerization process of butadiene carried out in the manner according to the present invention with the polymerization process according to the state of the art, it clearly emerges that the polybutadiene obtained by the process according to the present invention had a much higher cis-1,4 content, connected with a substantially lower metal ion content in the polymer and a substantially lower ash content. Furthermore, the catalyst consumption was much lower, connected with a substantially higher service life of the reactors.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A continuous process for producing elastomers based on conjugated dienes or based on conjugated dienes and vinyl aromatic compounds or based on alkenes, comprising the steps of carrying out polymerization in the presence of an inert solvent and in the presence of polymerization catalysts in at least two reactors connected in series, wherein the residence time of the monomers used and the elastomers formed in the first reactor being adjusted such that the residence time of the monomers used and the elastomers formed in the first reactor to the residence time of the monomers used and the elastomers formed in the remaining reactors being in the range of 1:1 to 4:1, the temperature gradient in the first reactor being $\leq 25°$ C. and the temperature in the individual reactors during polymerization being in the range of 0 to 140° C.

2. A process according to claim 1, wherein the residence time of the monomers used and the elastomers formed in the first reactor to the residence time of the monomers used and the elastomers formed in the remaining reactors is in the range of 1:1 to 3:1.

3. A process according to claim 1, wherein the temperature gradient in the first reactor is $\leq 15°$ C.

4. A process according to claim 1, wherein the temperature in the individual reactors during polymerization is in the range of 10 to 130° C.

5. A process according to claim 1, wherein the number of reactors connected in series is 2 to 10.

* * * * *